United States Patent
Foley

(10) Patent No.: US 9,710,379 B2
(45) Date of Patent: Jul. 18, 2017

(54) TUNING UTILIZATION AND HEAP MEMORY SIZE FOR REAL-TIME GARBAGE COLLECTION

(71) Applicant: International Business Machines Corporation, Armonk, NY (US)

(72) Inventor: Sean C. Foley, Chelmsford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 322 days.

(21) Appl. No.: 14/633,295

(22) Filed: Feb. 27, 2015

(65) Prior Publication Data

US 2016/0253103 A1    Sep. 1, 2016

(51) Int. Cl.
    G06F 12/02    (2006.01)
(52) U.S. Cl.
    CPC ................ *G06F 12/0276* (2013.01)
(58) Field of Classification Search
    CPC .................................................. G06F 12/0276
    USPC ................. 711/154, 156, 158; 707/813, 820
    See application file for complete search history.

(56) References Cited

U.S. PATENT DOCUMENTS

| | | | |
|---|---|---|---|
| 6,480,876 B2 * | 11/2002 | Rehg ..................... | G06F 9/5066 709/231 |
| 6,629,113 B1 | 9/2003 | Lawrence | |
| 6,658,652 B1 * | 12/2003 | Alexander, III ...... | G06F 9/5016 707/999.202 |
| 6,675,189 B2 * | 1/2004 | Rehg ..................... | G06N 99/005 709/231 |
| 7,167,881 B2 * | 1/2007 | Yasuda ............... | G06F 12/0276 |
| 7,467,278 B2 * | 12/2008 | Creamer ............ | G06F 11/3428 707/999.202 |
| 8,347,061 B2 * | 1/2013 | Varma ................... | G06F 12/023 711/163 |
| 8,356,061 B2 | 1/2013 | Vengerov | |

(Continued)

OTHER PUBLICATIONS

Chung, "Using JConsole to Monitor Applications," http://www.oracle.com/technetwork/articles/java/jconsole-1564139.html, Dec. 2004, pp. 1-14.*

(Continued)

*Primary Examiner* — Stephen Elmore
(74) *Attorney, Agent, or Firm* — Cantor Colburn LLP; Nicholas Bowman

(57) ABSTRACT

According to an aspect, a user interface is provided for assisting a user with identifying parameters for starting an application that utilizes real-time garbage collection (GC). The parameters include a fixed heap size and a GC central processing unit (CPU) utilization. Responsive to receiving a request from the user, the user is provided with options for profiling the application. The profiling includes executing the application. The options include targeting the GC CPU utilization to meet real-time requirements, targeting the heap size to meet the real-time requirements, and targeting a balance between the GC CPU utilization and the heap size to meet the real-time requirements. Responsive to detecting a selection of an option by the user, the application is profiled according to the option selected. The user is presented with results of the profiling via the user interface. The results include values for the parameters.

20 Claims, 5 Drawing Sheets

(56) References Cited

U.S. PATENT DOCUMENTS

| | | | | |
|---|---|---|---|---|
| 8,533,710 B1* | 9/2013 | Long | .................... | G06F 9/45558 |
| | | | | 718/1 |
| 8,566,812 B1* | 10/2013 | Printezis | ............. | G06F 9/45558 |
| | | | | 717/158 |
| 9,003,141 B2* | 4/2015 | Nielsen | ............... | G06F 11/1438 |
| | | | | 711/162 |
| 9,027,011 B1* | 5/2015 | Lam | .................... | G06F 9/44505 |
| | | | | 717/158 |
| 9,075,536 B1* | 7/2015 | Nielsen | ............... | G06F 11/1438 |
| 9,569,179 B1* | 2/2017 | Kachmar | ................... | G06F 8/30 |
| 2013/0167147 A1* | 6/2013 | Corrie | ................ | G06F 9/45533 |
| | | | | 718/1 |

OTHER PUBLICATIONS

Author Unknown, "Using jconsole," http://docs.oracle.com/javase/1.5.0/docs/guide/management/jconsole.html, downloaded Mar. 5, 2017, pp. 1-13.*

IBM, "Live Garbage Collection Tuning Recommendations"; Ip.com No. IPCOM000180171D; Mar. 5, 2009; 4 pages.

* cited by examiner

TUNING UTILIZATION AND HEAP MEMORY SIZE FOR REAL-TIME GARBAGE COLLECTION

BACKGROUND

The present disclosure relates generally to memory management, and more specifically, to tuning utilization and heap memory size for real-time garbage collection (GC).

Memory leakage, broadly defined, is the gradual loss of allocable memory due to the failure to de-allocate previously allocated, but no longer utilized memory. Typically, memory can be reserved for data having a brief lifespan. Once the lifespan has completed, the reserved memory ought to be returned to the pool of allocable memory so that the reserved memory can be used at a subsequent time as needed. Importantly, where memory leakage persists without remediation, ultimately not enough memory will remain to accommodate the needs of other processes.

Recognizing the importance of addressing the memory leakage problem, computer programming language theorists have developed the notion of garbage collection (GC). GC refers to the automated analysis of allocated memory to identify regions of allocated memory containing data which no longer are required for the operation of associated processes. In the context of object oriented programming languages such as the Java programming language, when objects residing in memory are no longer accessible within a corresponding application, the memory allocated to the no longer accessed object can be returned to the pool of allocable memory.

Real-time application development distinguishes itself from general-purpose application development by imposing time restrictions on parts of the runtime behavior. Such restrictions are typically placed on sections of the application such as an interrupt handler, where the code responding to the interrupt must complete its work in a given time period. When hard real-time systems that control, for example, heart monitors or defense systems, miss these deadlines it is considered a catastrophic failure of the entire system. This is contrasted with soft real-time systems where missed deadlines can have adverse effects, such as a graphic user interface (GUI) not displaying all results of a stream it is monitoring, but these adverse effects do not constitute a system failure.

In Java applications, the Java Virtual Machine (JVM) is responsible for optimizing runtime behavior, managing the object heap, and interfacing with the operating system and hardware. Although this management layer between the language and the platform eases software development, it introduces a certain amount of overhead into programs. One such area is GC, which typically causes non-deterministic pauses in the application. Both the frequency and length of the pauses are unpredictable, making the Java language traditionally unsuitable for real-time application development because real-time applications must respond to real-world stimuli within deterministic time intervals. A traditional GC can't meet this requirement because the application must halt for the GC to reclaim any unused memory. The time during which the application is halted is referred to as "pause time" because the application program is paused for the GC to reclaim free space.

SUMMARY

Embodiments include a method, system, and computer program product for tuning utilization and heap size for real-time garbage collection (GC). According to an aspect, a user interface is provided for assisting a user with identifying parameters for starting an application that utilizes real-time GC. The parameters include a fixed heap size and a GC central processing unit (CPU) utilization. Responsive to receiving a request from the user, the user is provided with options for profiling the application. The profiling includes executing the application. The options include targeting the GC CPU utilization to meet real-time requirements, targeting the heap size to meet the real-time requirements, and targeting a balance between the GC CPU utilization and the heap size to meet the real-time requirements. Responsive to detecting a selection of an option by the user, the application is profiled according to the option selected. The user is presented with results of the profiling via the user interface. The results include values for the parameters.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
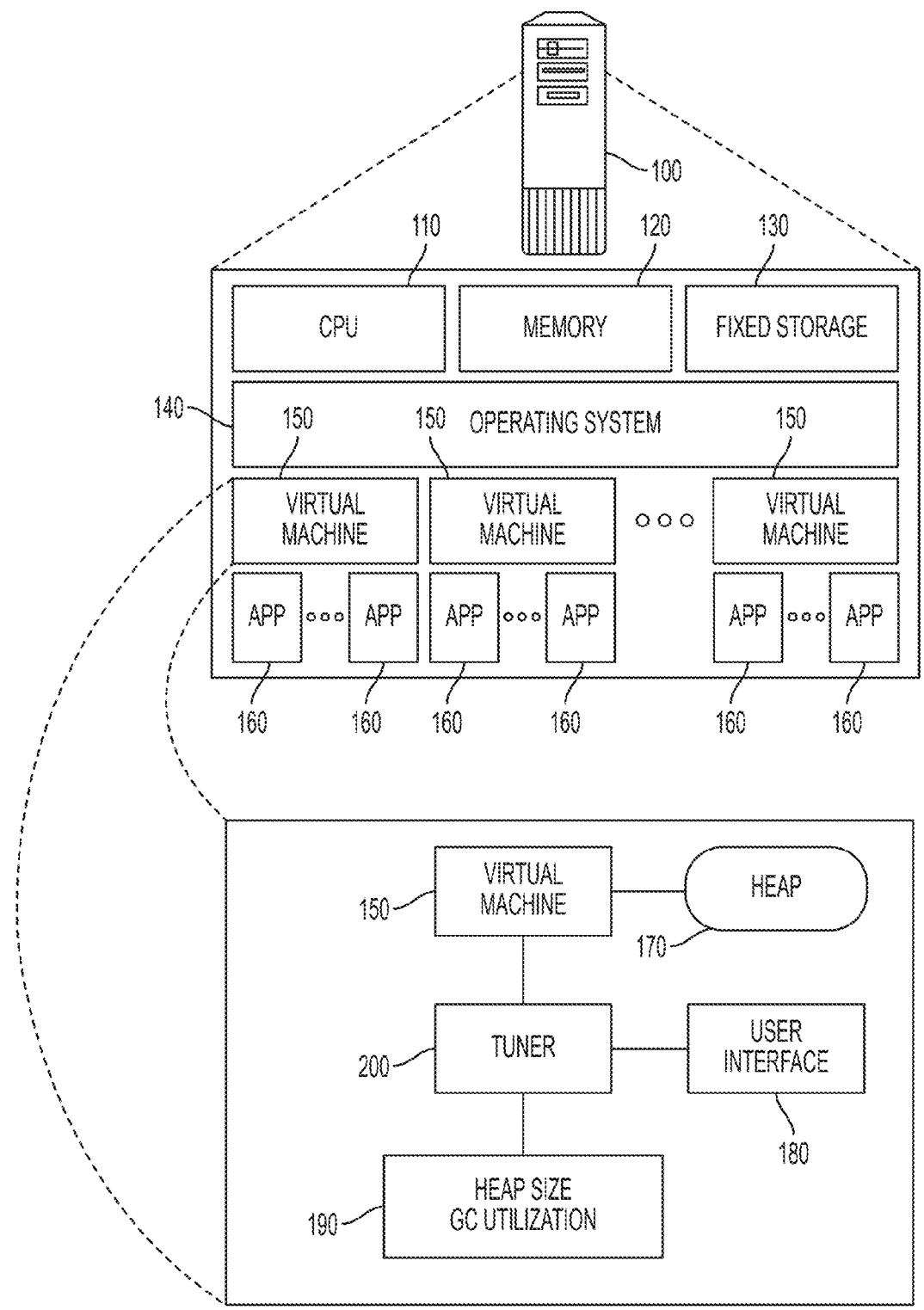
FIG. 1 depicts a block diagram of a system for tuning utilization and heap memory size for real-time garbage collection (GC) in accordance with an embodiment.

Embodiments described herein are directed to tuning real-time garbage collection (GC) parameters such as GC utilization and heap size for a given real-time application (e.g., a Java application). Embodiments include a separate tuner, or tuner application, that provides a user with recommended optimal settings for heap size and GC central processing unit (CPU) utilization for deployment of a given real-time application. Embodiments of the tuner attempt to set heap size and/or utilization parameters for real-time GC to optimal values that allow an application to meet real-time requirements (e.g., performance requirements). In one embodiment, the tuner application estimates a minimum GC CPU utilization parameter value corresponding to an optimal heap size value for GC that will allow the application to meet real-time requirements. The tuner application can also estimate a minimum heap size parameter value corresponding to an optimal GC CPU utilization value for GC that will allow the application to meet real-time requirements. In other embodiments, the tuner application estimates pairs of parameter values that balance minimizing the GC CPU utilization (also referred to herein as "GC utilization") and the heap size to meet real-time requirements.

In an embodiment, GC can be implemented by a Java Virtual Machine (JVM) that is used for allocation and freeing Java objects, array objects, and Java classes. In addition, GC can be used to allocate objects using a contiguous section of a Java heap and to ensure that the object remains as long as it is in use or "live." This determination can be made based on a reference from another live object or from outside of the heap. GC can be used to reclaim objects that are no longer referenced and to ensure that any finalize method is run before the object is reclaimed. GC can be broken down into several steps: mark (find all live objects in the system); sweep (reclaim unused heap memory to the free list) and compact (reduce fragmentation within the free list). Typically all of these steps are performed in a single stop-the-world (STW) phase where the application "pauses" while GC is performed. Use of the standard STW approach to GC can make it difficult to predict or to control how long the GC will take.

Embodiments utilize The Metronome Garbage Collector which is a component of the IBM® WebSphere® Real Time product. Benefits to using the Metronome Garbage Collector (also referred to herein as "Metronome") include that the time that it takes to perform GC is predictable and that GC can take place at set intervals over a period of time. A difference between Metronome GC and standard GC is that Metronome GC occurs in small interruptible steps while standard GC stops the application (e.g., via a STW phase) while it marks and collects garbage. Metronome relies on two parameters to ensure that GC can keep up with memory allocation in a real-time application: heap size (which does not change while the application executes, it is fixed sized and allocated on startup) and GC CPU utilization (referred to herein as "GC utilization").

The approach taken by Metronome is to divide the time that consumes GC cycles into a series of increments called "quanta." To accomplish this, each phase is designed to accomplish its total work in a series of discrete steps, allowing the garbage collector to: preempt the application for very short deterministic periods; make forward progress in the collection; and let the application resume. This sequence is in contrast to the traditional model where the application is halted at unpredictable points, the GC runs to completion for some unbounded period of time, and the GC then quiesces to let the application resume. Although splitting the STW GC cycle into short bounded pauses helps reduce the impact of GC on the application, this may not be sufficient for real-time applications.

For real-time applications to meet their real time requirements/deadlines, a sufficient portion of any given time period must be devoted to the application, otherwise the response time/performance requirements are violated and the application fails. For example, take a scenario where GC pauses are bounded at 1 millisecond. If the application is allowed to run for only 0.1 millisecond between every 1-millisecond GC pause, then little progress will be made, and even marginally complex real-time systems may fail because they lack time to progress. In effect, short pause times that are sufficiently close together are really no different from a full STW GC.

Thus, a different measure, utilization, is implemented in Metronome in addition to bounded pause times to provide a level of determinism for the percentages of time allotted to both the application and GC. The application utilization is the percentage of time allotted to an application in a given window of time continuously sliding over the complete run of the application. GC utilization is the percentage of time allotted to GC in a given window of time continuously sliding over the complete run of the application Metronome guarantees that a percentage of processing time is dedicated to the application. Use of the remaining time is at the discretion of the garbage collector: it can be allotted to the application or it can be used by the GC. Short pause times allow for finer-grained utilization guarantees than a traditional collector. As the time interval used for measuring utilization approaches zero, an application's expected utilization is either 0% or 100% because the measurement is below the GC quantum size. The guarantee for utilization is made strictly on measurements that are the size of the sliding window. In one example, Metronome can use quanta (a time slice) of 500 microseconds in length over a 10-millisecond window and a default application utilization target of 70%. Thus, during each time slice either the GC or the application is executed. To meet the 70% application utilization target, for any sliding window of 10 milliseconds (containing 20 time slices) there will be at most 6 GC quanta and at least 14 application quanta.

Metronome can also require that each GC quantum is followed by a least one application quantum even if the application utilization target in the sliding window would be preserved with back to back GC quanta. This can ensure that the application pause times are limited to the length of one quantum. However, if target application utilization is specified to be below 50%, some instances of back-to-back GC will occur to allow the GC to keep up with allocation.

The higher the GC utilization, the more processor time that is allocated towards completing each GC cycle. In addition, the larger the heap size, the longer the available time period to complete a GC cycle since it will take longer to run out of memory while the GC takes place. Therefore, one or the other of these parameters can be adjusted to ensure that there is always adequate available memory in the heap. Adjusting one or the other, or both, ensures that GC cycles are completed before excessive heap usage occurs. If heap memory is completely exhausted, this will either trigger a synchronous GC (the application including all threads is stopped for a full GC cycle) or termination of the application, which means that the application will fail to meet its real-time requirements. Websphere Real Time requires the GC utilization parameter value and the heap size value to be set beforehand, that is before starting an application. This is not something that can be done easily as it is not easy to estimate the memory requirements for an application at any given point in time, nor it is easy to do so across the lifetime of an application. However, it is very important to set the two parameters correctly, because otherwise the real-time requirements of the application will not be met. In addition to meeting any real-time requirements of the application, it is also beneficial to choose a heap size and GC utilization that maximize performance, or at least do not excessively degrade performance.

Embodiments described herein include a tuner for tuning the GC utilization and heap memory parameters for GC in real-time Java applications in order to help in ensuring that the application meets the real-time requirements such as, but not limited to adequate or maximum performance and/or adequate or optimal memory usage. Embodiments are described herein with respect to The Metronome Garbage Collector which is a component of the WebSphere Real Time product. The Metronome Garbage Collector is an example of a real-time garbage collector and embodiments are not limited to the Metronome Garbage Collector as they may be applied to any real-time garbage collector such as, but not limited to Java Virtual Machines by Oracle or other vendors, as the concepts of managing utilization and heap size apply to any real-time garbage collector.

Turning now to FIG. 1, a block diagram of a system for tuning utilization and heap memory size for real-time GC is generally shown in accordance with an embodiment. The data processing system shown in FIG. 1 includes a host computing platform 100. The host computing platform 100 can include a CPU 110, current memory 120 and fixed storage 130. An operating system 140 can moderate the utilization of the CPU 110, current memory 120 and fixed storage 130 for one or more host virtual machines 150. It is to be noted, however, that the virtual machines 150 can directly moderate access to the CPU 110, current memory 120 and fixed storage 130 in the absence of an intermediate operating system 140. In any case, each virtual machine 150 can host the operation of one or more applications 160.

Each virtual machine 150 can be configured to maximally consume a set amount of memory, referred to herein as the highest potential heap size. As shown in FIG. 1, a heap 170 can be allocated for use by the virtual machine 150. A tuner 200 (also referred to as a "tuner application") can include program code enabled to tune, or benchmark, an application 160 operating in the virtual machine 150 across multiple different heap sizes and GC utilizations. The tuner 200 can present a user with several options (e.g., what type of tuning should be performed) via a user interface 180 and output results of the tuning (e.g., a recommended parameter value for heap size and GC utilization) via the user interface 180. In addition, parameter values for an optimal GC utilization and heap size pair 190 can be stored by the tuner 200 and used as parameter values when the application is executed.

In an embodiment, the user of the tuner 200 identifies to the tuner 200 the real-time application to be tuned (or benchmarked) and indicates a time-out so that the tuner 200 knows how long to run the real-time application when collecting metrics. In addition, the user can select, via the user interface 180 a tuning methodology to be utilized by the tuner 200. The turning methodologies can include estimating a minimum GC utilization parameter for an associated optimal heap size; estimating a minimum heap size parameter for an associated optimal GC utilization; and estimating pairs of parameters that balance minimizing the GC CPU utilization and the heap size to meet real-time performance requirements. After selecting an option, the user can run the tuner application. After the tuning is performed, when deploying the real-time application, the user can then use the optimal heap size and utilization settings based on the results from the tuner.

Figure 2:
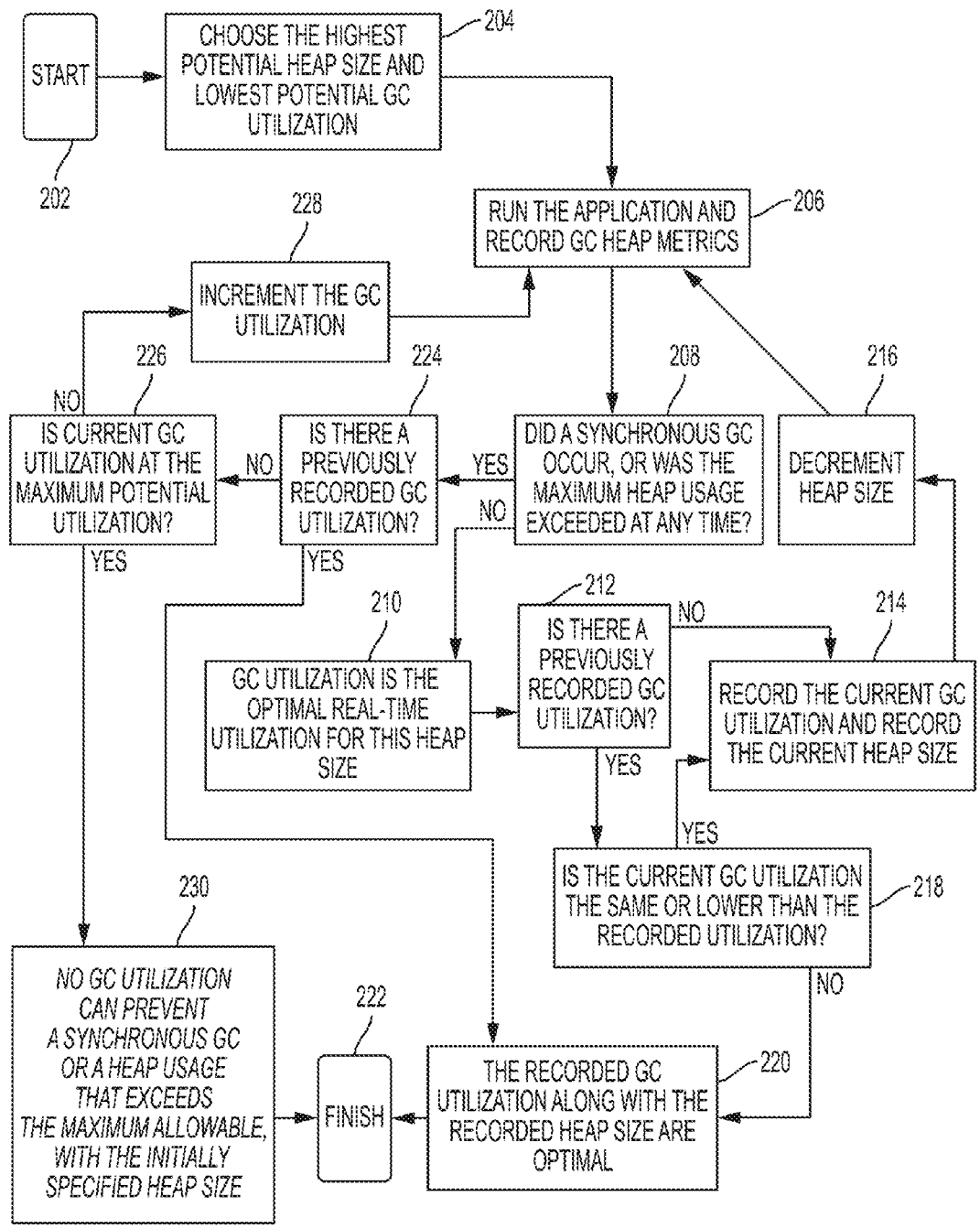
FIG. 2 depicts a process flow for maximizing GC utilization while meeting real-time requirements in accordance with an embodiment.

Turning now to FIG. 2, a process flow for minimizing GC utilization to meet real-time requirements is depicted in accordance with an embodiment. In an embodiment, the iterative process shown in FIG. 2 is performed by the tuner 200 based on a user selection of an option on the user interface 180 to minimize GC utilization (the option "targeting the GC CPU utilization to meet real-time requirements"). The process shown in FIG. 2 can be executed by the tuner 200 to find the minimal potential GC utilization, i.e., the optimal GC utilization that will meet real-time requirements of the application for the initial chosen heap size. Once the optimal minimal GC utilization is determined, then the process shown in FIG. 2 goes further to determine if an even smaller heap size will work with that optimal minimal GC utilization to meet the real-time requirements. In the embodiment shown in FIG. 2, the real-time requirements include preventing both a synchronous GC and not exceeding a maximum allowable heap usage while the application is executing. The maximum heap usage can be set based on system and/or application requirements to specify a heap usage number (in bytes, kilobyte, megabytes or other) or percentage that can never be exceed during any specific run of the application. A synchronous GC can occur when the application must cede to GC because there is no remaining available memory. Thus, the real-time GC has failed to ensure that there is always enough memory available for the application to continue. In this case, because the real-time GC has failed, the application has involuntarily stopped to cede control to a full GC cycle, which can take a long time, and which means the real-time requirements (e.g., performance metrics) have not been met.

Referring to FIG. 2, the process starts at block 202 and at block 204 the highest (or maximum) potential heap size and the lowest (or minimal) potential GC utilization (e.g., 1%) values are chosen. The highest potential heap size is an amount of memory measured in bytes, kilobytes, megabytes, gigabytes or some other memory amount. In an embodiment, it can be all of the available physical random access memory (RAM) on the computer system. Processing continues at block 206, where the application is executed and GC heap metrics are recorded. At block 208, the GC heap metrics are examined to determine whether a synchronous GC occurred or whether the maximum heap usage was exceeded at any time during the execution of the application. If either of these things occurred, then the GC utilization needs to be increased and processing continues at block 224 where it is determined whether there was a previously recorded GC utilization. There will be no recorded GC utilization the first time through block 208. Processing continues at block 226 where it is determined whether the current GC utilization is at the maximum potential utilization. If the current GC utilization is not at the maximum potential utilization, then processing continues at block 228 where the GC utilization is incremented. Processing continues at block 206, where the application is executed with the new increased GC utilization. In an embodiment, the cycle going from block 206, to block 208, to block 224, to block 226, to block 228, and back to block 206, is repeated until eventually the application run in block 206 successfully completes without running out of memory.

That successful run might never occur if, at block 226, it is determined that the current GC utilization is at the maximum potential GC utilization. Should that be the case, then processing continues at block 230 with a message output to the user, via the user interface 180, that indicates that there is no GC utilization that can prevent a synchronous GC with the initially specified heap size. The process then finishes at block 222 without having found an optimal GC utilization.

If that successful run of the application eventually occurs at block 208, where it is determined that neither a synchronous GC occurred nor was the maximum heap size exceeded at any time while executing the application at block 206, then this means that the GC utilization has been increased to a point that allows the application to run without failing the heap size requirement. Processing continues at block 210 where it is determined that the current GC utilization is the optimal GC utilization for the current heap size, it being the first incremented utilization to allow the application to complete without exceeding the heap size requirement. Processing continues at block 212.

At this point in the processing, an optimal GC utilization has been found, and the next question becomes whether the initially specified heap size can be even lower when using this optimal GC utilization. The first time reaching this point, there will be no previously recorded optimal GC utilization.

If it is determined at block 212 that there is no previously recorded GC utilization, then processing continues at block 214 where the current GC utilization and the current heap size are recorded. Processing continues at block 216, where the heap size is decremented, and the process begins anew with this lower heap size, in order to see if the optimal GC utilization can work with a lower heap size.

If there was a previously recorded GC utilization at block 212 but this one is even better (lower), then this has now become the optimal GC utilization for the initially specified heap size. At block 218 the process once again moves to block 214 to record this newly optimal GC utilization and to lower the heap size again at block 216. The process continues with the lower heap size.

If there was a previously recorded GC utilization at block 212, but this new GC utilization is worse (higher), then processing continues at block 220, where the previously recorded GC utilization (the optimal GC utilization) and the previously recorded heap size (the lowest heap size to work with that optimal utilization) are output as suggested parameter values to the user, via the user interface 180. The process finishes at block 222.

After finding an optimal GC utilization for the current heap size, and the heap size is decremented at block 216, then that lower heap size might not work with that optimal GC utilization at block 206, and then at block 208 the process continues to block 224 because the application ran out of memory with the lower heap size. At block 224, it is seen that there was a previously recorded GC utilization from a successful run of the application so then processing moves to block 220 to end the processing. At block 220, the previously recorded optimal GC utilization along with the lowest heap size to work with that GC utilization are output as suggested parameter values to the user, via the user interface 180.

In summary, at block 220, the optimal (minimal) GC utilization is the one that was found to work with the initially chosen heap size, and the final heap size is the same, or it is an even smaller heap size that still works with that optimal GC utilization.

When the processing in FIG. 2 is completed, either the optimal GC utilization value is recorded along with an associated optimal heap size value for that utilization or it is determined that no GC utilization value is adequate for the application with the initially chosen heap size.

As described previously, another methodology that can be implemented by the tuner 200 is to find the minimum potential heap size that will meet real-time requirements given an initially specified GC utilization, followed by finding whether an even smaller GC utilization will work with that same optimal minimum heap size. Input to the process includes a maximal allowable heap usage that can never be exceeded during any specific run of the application. The process is similar to the process shown in FIG. 2, except that the heap size is the parameter that is adjusted first until the optimal size is found, and then GC utilization is adjusted afterwards to be optimal for the optimal heap size.

Figure 3:
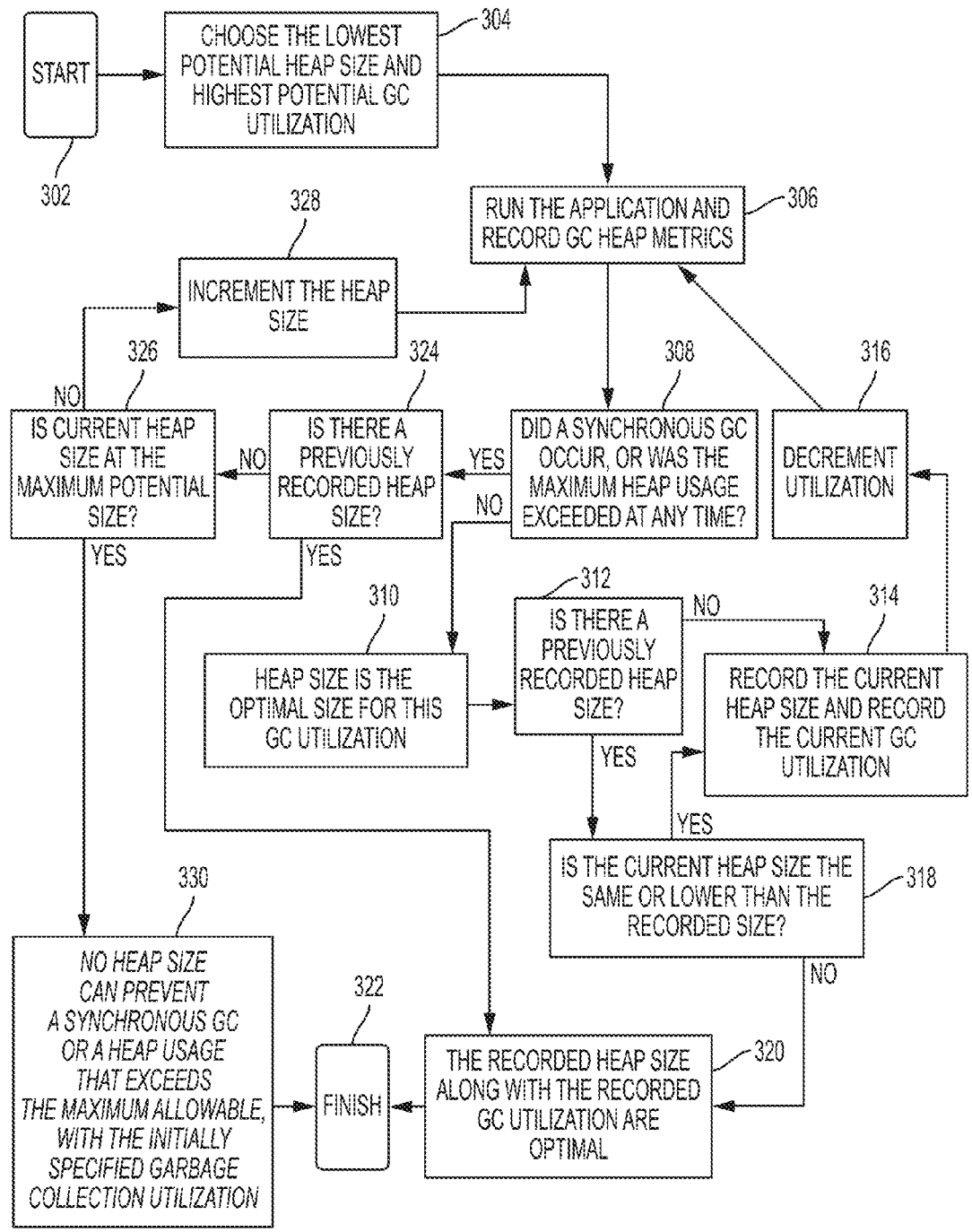
FIG. 3 depicts a process flow for maximizing heap size while meeting real-time requirements in accordance with an embodiment.

Turning now to FIG. 3, a process flow for minimizing the heap size to meet real-time requirements is depicted in accordance with an embodiment. In an embodiment, the iterative process shown in FIG. 3 is performed by the tuner 200 based on a user selection of an option on the user interface 180 to minimize heap size (also referred to herein as "targeting the heap size to meet real-time requirements").

The process starts at block 302 and at block 304 the lowest (or minimum) potential heap size and the highest (or maximum) potential GC utilization values are chosen. The highest potential GC utilization value can be set based on implementation and/or application requirements. Processing continues at block 306, where the application is executed and GC heap metrics are recorded. At block 308, the GC heap metrics are examined to determine whether a synchronous GC occurred or whether the maximum heap usage was exceeded at any time during the execution of the application. If either of these things occurred, then the heap size needs to be increased and processing continues at block 324 where it is determined whether there was a previously recorded heap size. There will be no recorded heap size the first time through block 208. Processing continues at block 326 where it is determined whether the current heap size is at the maximum potential heap size. If the current heap size is not at the maximum potential heap size, then processing continues at block 328 where the heap size is incremented. Processing continues at block 306, where the application is executed with the new increased heap size.

The cycle going from block 306, to block 308, to block 324, to block 326, to block 328, and back to block 306, is repeated until eventually the application run in block 206 successfully completes without running out of memory.

That successful run might never occur if, at block 326, it is determined that the current heap size is at the maximum potential size. Should that be the case, then processing continues at block 330 with a message output to the user, via the user interface 180 that indicates that there is no heap size that can prevent a synchronous GC or a heap usage that exceeds the maximum allowable heap usage, with the initially specified GC utilization. The process then finishes at block 322.

If that successful run of the application eventually occurs at block 308, where it is determined that neither a synchronous GC occurred nor was the maximum heap size exceeded at any time while executing the application at block 306, then this means that the heap size has been increased to a point that allows the application to run without running out of memory. Processing continues at block 310 where it is determined that the current heap size is the optimal heap size for the current GC utilization. Processing continues at block 312.

At this point in the processing, an optimal heap size has been found, and the next question becomes whether the initially specified GC utilization can be even lower when using this optimal heap size. The first time reaching this point, there will be no previously recorded heap size.

If it is determined at block 312 that there is no previously recorded heap size, then processing continues at block 314 where the current GC utilization and the current heap size are recorded. Processing continues at block 316, where the GC utilization is decremented, and the process begins anew with this lower utilization, in order to see if the optimal heap size can work with a lower GC utilization.

If there was a previously recorded heap size at block 312 but this one is even better (lower), then this has now become the optimal heap size for the initially specified GC utilization. At block 318 the process once again moves to block 314 to record this newly optimal heap size and to lower the GC utilization again at block 316. The process continues with the lower GC utilization.

If there was a previously recorded heap size at block 312, but this new heap size is worse (higher), then processing continues at block 320, where the previously recorded heap size (the optimal heap size) and the previously recorded GC utilization (the lowest GC utilization to work with that optimal heap size) are output as suggested parameter values to the user, via the user interface 180. The process finishes at block 322.

After finding an optimal heap size for the GC utilization and after that GC utilization is decremented at block 316, then that lower GC utilization might not work with that optimal heap size at block 306, and then at block 308 the process continues to block 324 because the application ran out of memory with the lower GC utilization. At block 324, it is seen that there was a previously recorded heap size from a successful run of the application so then processing moves to block 320 to end the processing. At block 320, the previously recorded optimal heap size along with the lowest GC utilization to work with that heap size are output as suggested parameter values to the user, via the user interface 180.

In summary, at block 320, the optimal heap size is the one that was found to work with the initially chosen GC utilization, and the final GC utilization is the same, or it is an even smaller GC utilization that still works with that optimal heap size.

When the processing in FIG. 3 is completed, either the optimal heap size value is recorded along with an associated optimal GC utilization value for that heap size or it is determined that no heap size value is adequate for the application with the initially chosen GC utilization.

Figure 4:
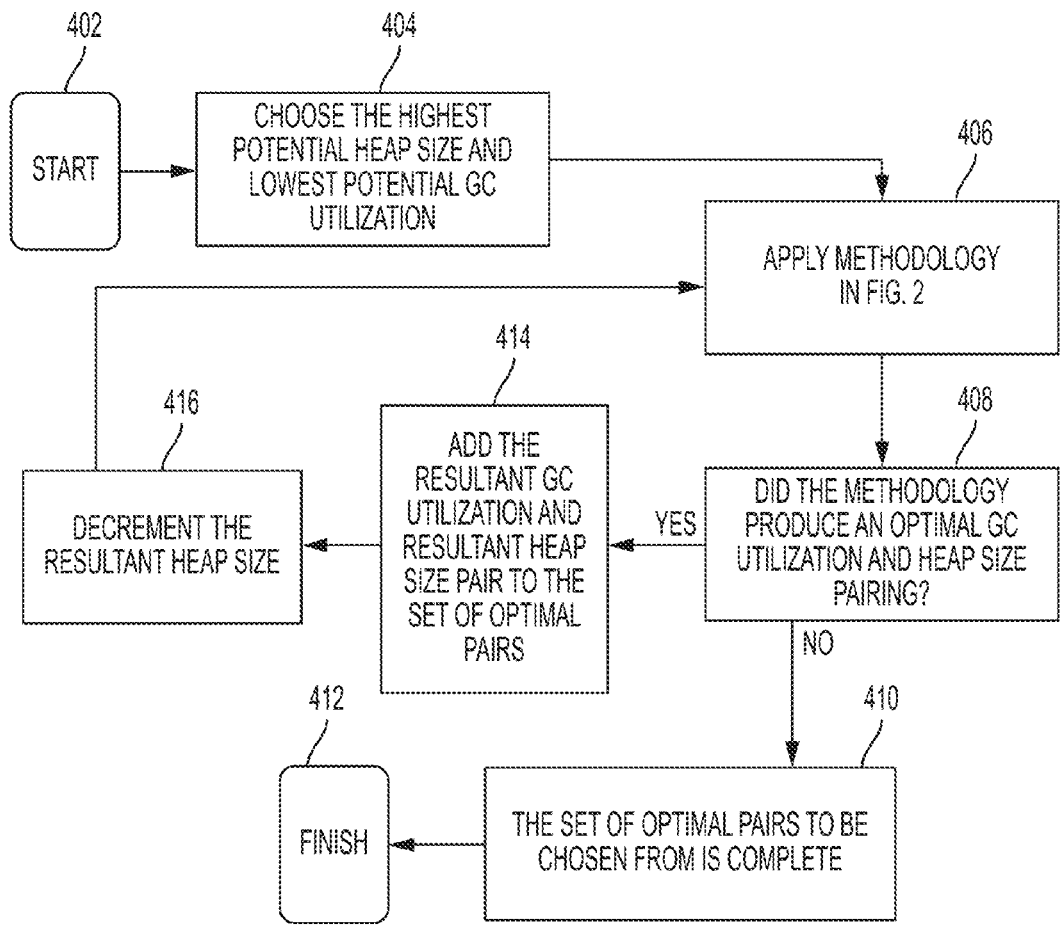
FIG. 4 depicts a process flow for balancing maximizing heap size and GC utilization while meeting real-time requirements in accordance with an embodiment.

Turning now to FIG. 4, a process flow for balancing minimizing heap size and GC utilization to meet real-time requirements is generally shown in accordance with an embodiment. In an embodiment, the process shown in FIG. 4 is performed by the tuner 200 based on a user selection of an option on the user interface 180 to find pairs of optimal heap size and GC utilization parameter values (also referred to herein as "targeting a balance between the GC CPU utilization and the heap size to meet real-time requirements"). The process depicted in FIG. 4 combines elements of the processes shown in FIGS. 2 and 3 to find a set of heap size and GC utilization pairs that are optimal for the application. In an embodiment, the set of pairs will have the following property: consider any one pairing of heap size and GC utilization, if any other pairing in the set has a lower heap size, then it has a higher GC utilization and if any other pairing in the set has a lower GC utilization, it has a higher heap size. Once the processing shown in FIG. 4 is complete, the user will be able to make the choice of balancing increased GC with decreased heap size in order to meet the real-time requirements. The user will be able to make a choice that is optimal for the current deployment of the real-time application.

Referring to FIG. 4, the process is started at block 402 and at block 404, the highest potential heap size and the lowest potential GC utilization is chosen. Processing continues at block 406 where the process shown in FIG. 2 is performed to find the minimum GC utilization that will work with the initial heap size, and the lowest heap size that will work with that optimal GC utilization to meet the real-time requirements of the application. If, as determined at block 408, the processing at block 406 results in producing an optimal GC utilization and heap size pairing, then processing continues at block 414 where the optimal GC utilization and its associated heap size pair are added to the set of optimal pairs. Processing then continues at block 416, wherein the associated heap size in the pair is decremented for input to block 406 along with the same GC utilization from the pair. If, as determined at block 408, the processing at block 406 does not produce an optimal GC utilization and heap size pairing, then processing continues at block 410 where the set of optimal pairs to be chosen from is considered to be complete and the set of optimal pairs are output as suggested parameter values to the user, via the user interface 180. The process ends at block 412.

Thus, an embodiment of the process shown in FIG. 4 results in targeting a balance between the GC CPU utilization and the heap size to meet the real-time requirements by: starting with a maximum potential heap size, a minimum GC CPU utilization, and an empty list of optimal heap size value and GC CPU utilization value pairs; iterating through potential heap size values in a stepwise fashion by decrementing the potential heap size value in each iteration, each iteration including executing the application to determine whether a corresponding minimal GC CPU utilization value exists; based on determining that a corresponding minimal GC CPU utilization value exists, adding a pairing of the heap size value and the minimal GC CPU utilization value to the list of optimal heap size and GC utilization value pairs; and based on determining that a corresponding minimal GC CPU utilization value does not exist, terminating the iterating.

In an embodiment, the GC heap metrics are recorded while running the real-time application. Any tools for gathering metrics may be utilized. For example, a real-time Java virtual machine can provide utilities to monitor the memory usage and other characteristics of a running real-time Java application. For the real-time Java implementation provided of Websphere Real Time by IBM these can include verbose GC, tracing GC, and the GC memory visualizer.

Figure 5:
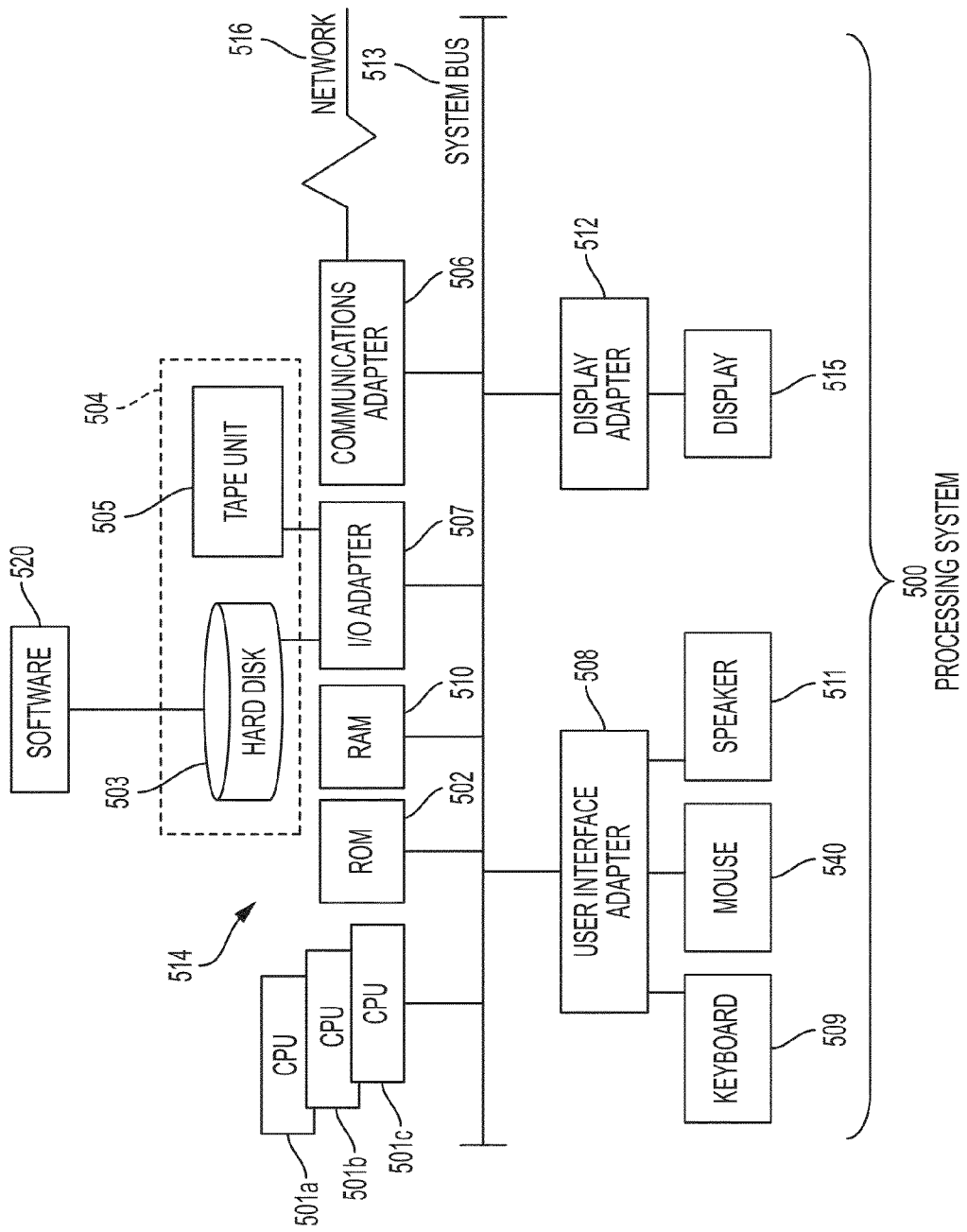
FIG. 5 depicts a processing system in accordance with an embodiment.

Referring now to FIG. 5, there is shown an embodiment of a processing system 500 for implementing the teachings herein. In this embodiment, the processing system 500 has one or more central processing units (processors) 501*a*, 501*b*, 501*c*, etc. (collectively or generically referred to as processor(s) 501). Processors 501, also referred to as processing circuits, are coupled to system memory 514 and various other components via a system bus 513. Read only memory (ROM) 502 is coupled to system bus 513 and may include a basic input/output system (BIOS), which controls certain basic functions of the processing system 500. The system memory 514 can include ROM 502 and random access memory (RAM) 510, which is read-write memory coupled to system bus 513 for use by processors 501.

FIG. 5 further depicts an input/output (I/O) adapter 507 and a network adapter 506 coupled to the system bus 513. I/O adapter 507 may be a small computer system interface (SCSI) adapter that communicates with a hard disk 503 and/or tape storage drive 505 or any other similar component. I/O adapter 507, hard disk 503, and tape storage drive 505 are collectively referred to herein as mass storage 504. Software 520 for execution on processing system 500 may be stored in mass storage 504. The mass storage 504 is an example of a tangible storage medium readable by the processors 501, where the software 520 is stored as instructions for execution by the processors 501 to perform a method, such as the process flows shown in FIGS. 2-4. Network adapter 506 interconnects system bus 513 with an outside network 516 enabling processing system 500 to communicate with other such systems. A screen (e.g., a display monitor) 515 is connected to system bus 513 by display adapter 512, which may include a graphics controller to improve the performance of graphics intensive applications and a video controller. In one embodiment, adapters 507, 506, and 512 may be connected to one or more I/O buses that are connected to system bus 513 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 513 via user interface adapter 508 and display adapter 512. A keyboard 509, mouse 540, and speaker 511 can be interconnected to system bus 513 via user interface adapter 508, which may include, for example, a Super I/O chip integrating multiple device adapters into a single integrated circuit.

Thus, as configured in FIG. 5, processing system 500 includes processing capability in the form of processors 501, and, storage capability including system memory 514 and mass storage 504, input means such as keyboard 509 and mouse 540, and output capability including speaker 511 and display 515. In one embodiment, a portion of system memory 514 and mass storage 504 collectively store an operating system to coordinate the functions of the various components shown in FIG. 5.

Technical effects and benefits include the ability to tune GC parameters to meet real-time application requirements.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   providing a user interface to a user for assisting the user with identifying parameters for starting an application that utilizes real-time garbage collection (GC), the parameters including a fixed heap size and a GC central processing unit (CPU) utilization;
   responsive to receiving a request from the user, providing the user with options for profiling the application, the options including targeting the GC CPU utilization to meet real-time requirements, targeting the heap size to meet the real-time requirements, and targeting a balance between the GC CPU utilization and the heap size to meet the real-time requirements;
   responsive to detecting a selection of an option by the user, profiling the application according to the option selected, the profiling including executing the application; and
   presenting the user with results of the profiling, the presenting via the user interface and the results including values for the parameters.

2. The method of claim 1, wherein the real-time requirements include not exceeding a maximum heap usage percentage during execution of the application and preventing a synchronous GC during execution of the application.

3. The method of claim 1, wherein based on the user selecting the option for targeting the GC CPU utilization to meet real-time requirements, the profiling includes:
   starting with a maximum potential heap size value and a minimum GC CPU utilization value;
   executing the application iteratively to identify a minimal GC CPU utilization value that meets the real-time requirements; and
   based on identifying the minimal GC CPU utilization value meeting the real-time requirements, executing the application iteratively to determine a minimum heap size value for the minimal GC CPU utilization value.

4. The method of claim 1, wherein based on the user selecting the option for targeting the heap size to meet real-time requirements, the profiling includes:
   starting with a minimum potential heap size value and a maximum GC CPU utilization value;
   executing the application iteratively to identify a minimal heap size value that meets the real-time requirements; and
   based on identifying the minimal heap size value that meets the real-time requirements, executing the application iteratively to determine a minimum GC CPU utilization value for the minimum heap size value.

5. The method of claim 1, wherein based on the user selecting the option for targeting a balance between the GC CPU utilization and the heap size to meet real-time requirements, the profiling includes:
   starting with a maximum potential heap size, a minimum GC CPU utilization, and an empty list of optimal heap size value and GC CPU utilization value pairs;
   iterating through potential heap size values in a stepwise fashion by decrementing the potential heap size value in each iteration, each iteration including executing the application to determine whether a corresponding minimal GC CPU utilization value exists;
   based on determining that a corresponding minimal GC CPU utilization value exists, adding a pairing of the heap size value and the minimal GC CPU utilization value to the list of optimal heap size and GC utilization value pairs; and
   based on determining that a corresponding minimal GC CPU utilization value does not exist, terminating the iterating.

6. The method of claim 1, further comprising setting the parameters to the values and executing the application based on the parameters.

7. The method of claim 1, wherein the application is a real-time Java application and the GC is performed over set intervals over a period of time.

8. A computer program product comprising:
   a tangible storage medium readable by a processor and storing instructions for execution by the processor to perform a method comprising:
   providing a user interface to a user for assisting the user with identifying parameters for starting an application that utilizes real-time garbage collection (GC), the parameters including a fixed heap size and a GC central processing unit (CPU) utilization;
   responsive to receiving a request from the user, providing the user with options for profiling the application, the options including targeting the GC CPU utilization to meet real-time requirements, targeting the heap size to meet the real-time requirements, and targeting a balance between the GC CPU utilization and the heap size to meet the real-time requirements;

responsive to detecting a selection of an option by the user, profiling the application according to the option selected, the profiling including executing the application; and presenting the user with results of the profiling, the presenting via the user interface and the results including values for the parameters.

9. The computer program product of claim 8, wherein the real-time requirements include not exceeding a maximum heap usage percentage during execution of the application and preventing a synchronous GC during execution of the application.

10. The computer program product of claim 8, wherein based on the user selecting the option for targeting the GC CPU utilization to meet real-time requirements, the profiling includes:

starting with a maximum potential heap size value and a minimum GC CPU utilization value;

executing the application iteratively to identify a minimal GC CPU utilization value that meets the real-time requirements; and based on identifying the minimal GC CPU utilization value meeting the real-time requirements, executing the application iteratively to determine a minimum heap size value for the minimal GC CPU utilization value.

11. The computer program product of claim 8, wherein based on the user selecting the option for targeting the heap size to meet real-time requirements, the profiling includes:

starting with a minimum potential heap size value and a maximum GC CPU utilization value;

executing the application iteratively to identify a minimal heap size value that meets the real-time requirements; and based on identifying the minimal heap size value that meets the real-time requirements, executing the application iteratively to determine a minimum GC CPU utilization value for the minimum heap size value.

12. The computer program product of claim 8, wherein based on the user selecting the option for targeting a balance between the GC CPU utilization and the heap size to meet real-time requirements, the profiling includes:

starting with a maximum potential heap size, a minimum GC CPU utilization, and an empty list of optimal heap size value and GC CPU utilization value pairs;

iterating through potential heap size values in a stepwise fashion by decrementing the potential heap size value in each iteration, each iteration including executing the application to determine whether a corresponding minimal GC CPU utilization value exists;

based on determining that a corresponding minimal GC CPU utilization value exists, adding a pairing of the heap size value and the minimal GC CPU utilization value to the list of optimal heap size and GC utilization value pairs; and based on determining that a corresponding minimal GC CPU utilization value does not exist, terminating the iterating.

13. The computer program product of claim 8, wherein the method further comprises setting the parameters to the values and executing the application based on the parameters.

14. The computer program product of claim 8, wherein the application is a real-time Java application and the GC is performed over set intervals over a period of time.

15. A system comprising:

a memory having computer readable instructions; and a processor for executing the computer readable instructions, the computer readable instructions including:

providing a user interface to a user for assisting the user with identifying parameters for starting an application that utilizes real-time garbage collection (GC), the parameters including a fixed heap size and a GC central processing unit (CPU) utilization;

responsive to receiving a request from the user, providing the user with options for profiling the application, the options including targeting the GC CPU utilization to meet real-time requirements, targeting the heap size to meet the real-time requirements, and targeting a balance between the GC CPU utilization and the heap size to meet the real-time requirements;

responsive to detecting a selection of an option by the user, profiling the application according to the option selected, the profiling including executing the application; and presenting the user with results of the profiling, the presenting via the user interface and the results including values for the parameters.

16. The system of claim 15, wherein the real-time requirements include not exceeding a maximum heap usage percentage during execution of the application and preventing a synchronous GC during execution of the application.

17. The system of claim 15, wherein based on the user selecting the option for targeting the GC CPU utilization to meet real-time requirements, the profiling includes:

starting with a maximum potential heap size value and a minimum GC CPU utilization value;

executing the application iteratively to identify a minimal GC CPU utilization value that meets the real-time requirements; and based on identifying the minimal GC CPU utilization value meeting the real-time requirements, executing the application iteratively to determine a minimum heap size value for the minimal GC CPU utilization value.

18. The system of claim 15, wherein based on the user selecting the option for targeting the heap size to meet real-time requirements, the profiling includes:

starting with a minimum potential heap size value and a maximum GC CPU utilization value;

executing the application iteratively to identify a minimal heap size value that meets the real-time requirements; and based on identifying the minimal heap size value that meets the real-time requirements, executing the application iteratively to determine a minimum GC CPU utilization value for the minimum heap size value.

19. The system of claim 15, wherein based on the user selecting the option for targeting a balance between the GC CPU utilization and the heap size to meet real-time requirements, the profiling includes:

starting with a maximum potential heap size, a minimum GC CPU utilization, and an empty list of optimal heap size value and GC CPU utilization value pairs;

iterating through potential heap size values in a stepwise fashion by decrementing the potential heap size value in each iteration, each iteration including executing the application to determine whether a corresponding minimal GC CPU utilization value exists;

based on determining that a corresponding minimal GC CPU utilization value exists, adding a pairing of the heap size value and the minimal GC CPU utilization value to the list of optimal heap size and GC utilization value pairs; and based on determining that a corresponding minimal GC CPU utilization value does not exist, terminating the iterating.

20. The system of claim 15, wherein the instructions further comprise setting the parameters to the values and executing the application based on the parameters.

* * * * *